No. 729,490. PATENTED MAY 26, 1903.
J. L. COX.
CORN PLANTER.
APPLICATION FILED DEC. 17, 1902.
NO MODEL. 3 SHEETS—SHEET 1.
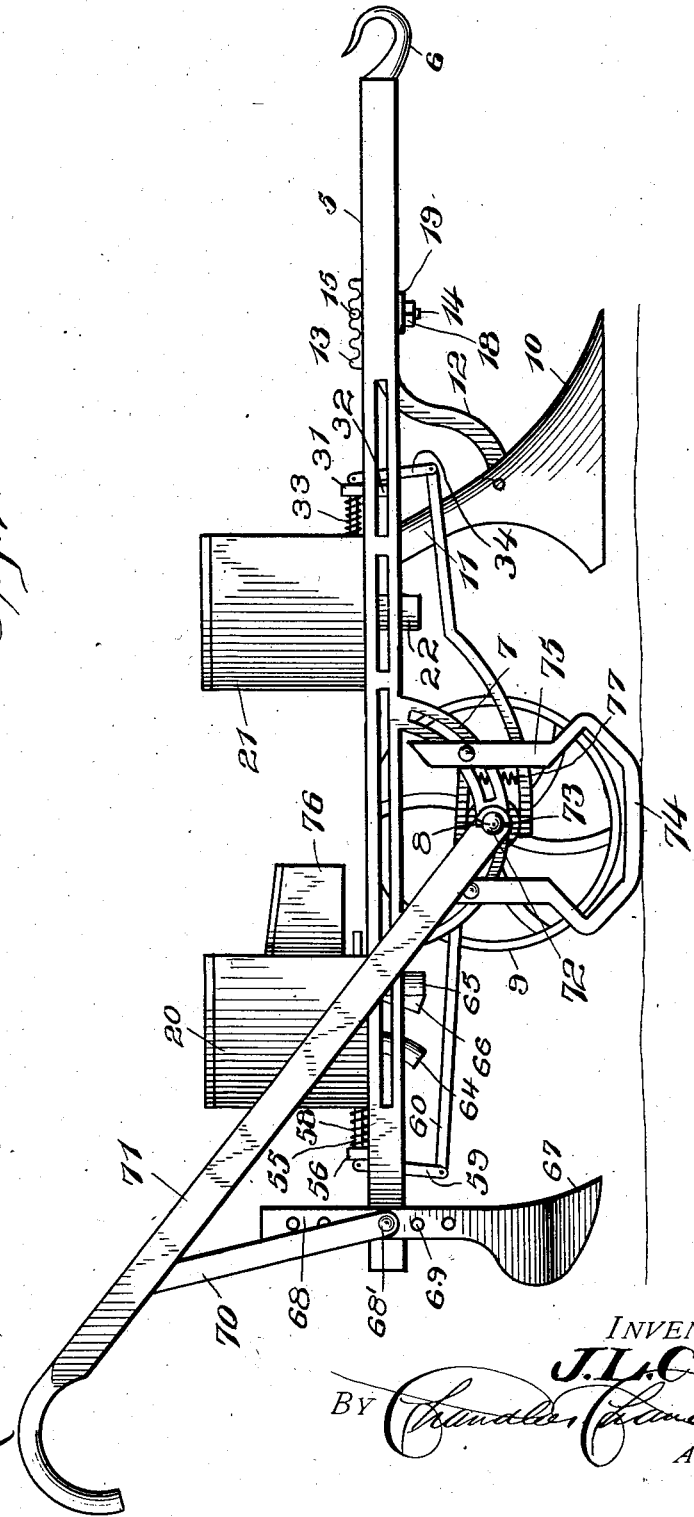

No. 729,490. PATENTED MAY 26, 1903.
J. L. COX.
CORN PLANTER.
APPLICATION FILED DEC. 17, 1902.
NO MODEL. 3 SHEETS—SHEET 2.
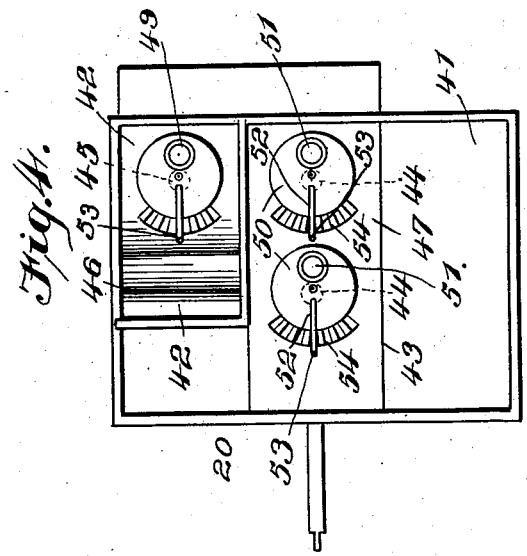
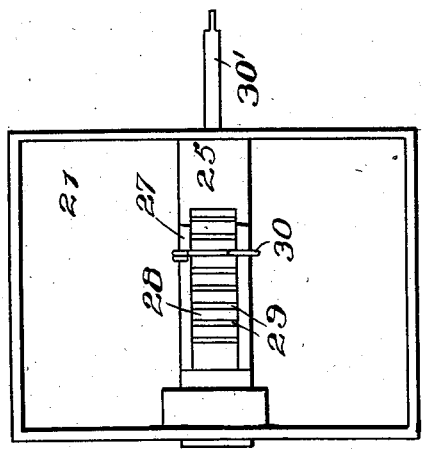
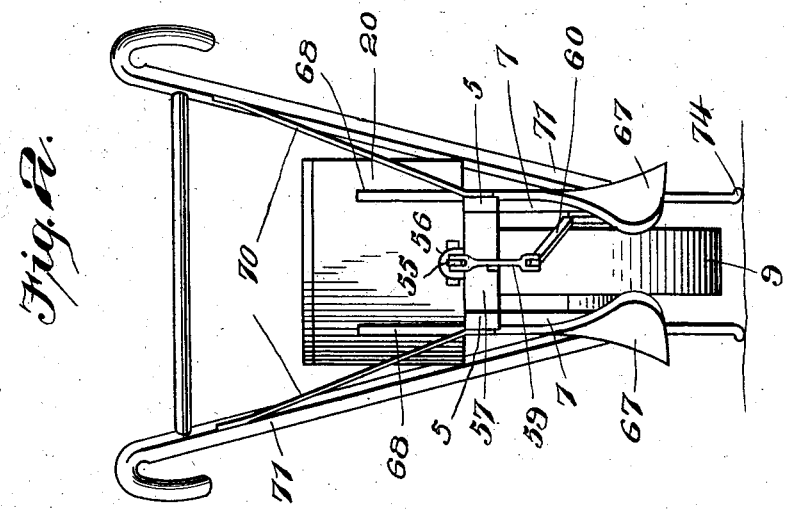
WITNESSES: INVENTOR
J. L. Cox,
BY
Attorneys

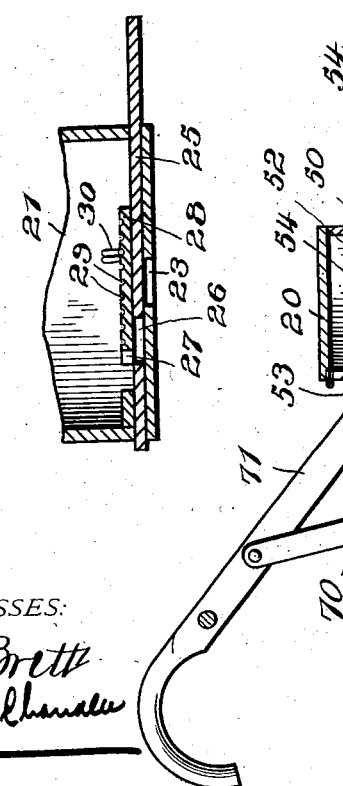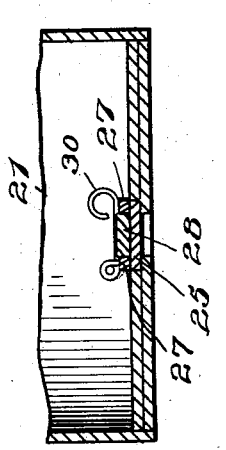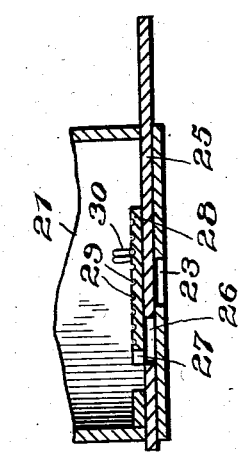

No. 729,490. Patented May 26, 1903.

UNITED STATES PATENT OFFICE.

JEFFERSON L. COX, OF QUOIT, VIRGINIA, ASSIGNOR OF ONE-HALF TO A. L. DICKERSON AND S. M. STANLEY, OF RORRER, VIRGINIA.

CORN-PLANTER.

SPECIFICATION forming part of Letters Patent No. 729,490, dated May 26, 1903.

Application filed December 17, 1902. Serial No. 135,512. (No model.)

*To all whom it may concern:*

Be it known that I, JEFFERSON L. COX, a citizen of the United States, residing at Quoit, in the county of Floyd, State of Virginia, have invented certain new and useful Improvements in Corn-Planters; and I do hereby declare the following to be a full, clear, and exact description of the invention, such as will enable others skilled in the art to which it appertains to make and use the same.

This invention relates to planters, and more particularly to that class employed for planting corn, beans, and similar seeds; and it has for its object to provide a construction wherein both corn and beans may be simultaneously planted, and in which fertilizer will be deposited after the furrow has been opened, and in which after the fertilizing and dropping operations the seeds will be covered, the several parts being constructed and arranged for adjustment to plant and cover to different depths.

A further object of the invention is to provide a simple and efficient dropping mechanism and means for arresting the dropping operation automatically when the planter reaches ground which is too hard to permit of the opening of a furrow, so that the waste of seed on hard ground is prevented.

Other objects and advantages of the invention will be understood from the following description.

In the drawings forming a portion of this specification, and in which like numerals of reference indicate similar parts in the several views, Figure 1 is a side elevation of the implement. Fig. 2 is a rear elevation. Fig. 3 is a central vertical section taken longitudinally through the implement, the ground-wheel, with its cam, and the coöperating pitmen of the dropping mechanism being in elevation. Fig. 4 is a top plan view of the regulating means for the valve mechanism in the seed-hopper. Fig. 5 is a top plan view of the regulating means for the valve mechanism in the fertilizer-hopper. Fig. 6 is a section taken longitudinally through the slide illustrated in Fig. 5, and Fig. 7 is a section at right angles to the section shown in Fig. 6.

Referring now to the drawings, the present implement comprises a bifurcated beam including the sides 5, connected at their forward ends, and having a hook 6 for attachment of draft appliances, and the sides of the beam are of skeleton formation for the purpose of lightening the structure. Depending from the sides of the beam are the spaced brackets 7, in which is journaled an axle 8, that carries the ground-wheel 9, from which the dropping mechanism is operated, as hereinafter described.

In the operation of the implement the furrow is first opened, fertilizer is then deposited, seeds are next dropped, and, finally, the seeds are covered. To open the furrow, a share 10 is provided, and has a standard 11, the upper end of which is bifurcated, and the members are pivoted to the inner faces of the sides 5 of the beam, so that the share may be swung in a vertical plane longitudinally of the implement to raise and lower the point thereof, and thus determine the depth to which the furrow is to be opened, it being understood that the downward movement of the share into the earth is limited by the ground-wheel, excepting, of course, when the beam is tilted on the ground-wheel as a pivot.

To hold the standard of the furrow-opener at different points of its pivotal adjustment, a brace 12 is pivoted between the sides of the upper portion of the standard and extends forwardly and upwardly between the sides of the beam and between racks 13, which are secured to the inner faces of the sides of the beam. A bolt 14 is engaged with the ends of the laterally-directed lugs 15 in the racks and with its body portion depending between the racks and below the beam, and in the body portion of the bolt is a slot 16, in which is pivotally engaged the forward end of the brace by means of the transverse pivot-pin 17. By raising the bolt to disengage its head from the racks it may be shifted longitudinally of the beam to swing the brace and correspondingly move the furrow-opener and its standard, and to hold the bolt in the racks after its adjustment a nut 18 is engaged therewith and impinges against a washer 19, disposed against the bottom of the beam to draw the bolt downwardly.

Two hoppers 20 and 21 are employed, one between the furrow-opener and the ground-wheel to receive the fertilizer and the other in the rear of the ground-wheel to receive the seeds to be planted. The hopper 21 is provided with a discharge-spout 22, with which communicates the opening 23 in the bottom of the hopper and which opening is at the bottom of a longitudinal groove 24, in which is disposed a slide 25, the ends of which are passed through the front and back walls of the hopper through continuations of the slot. The slide has a longitudinally-extending slot 26, at opposite sides of which are the longitudinal ribs 27, between which is slidably mounted a gate 28, having transverse grooves 29, and this gate is slidable between the ribs to open the slot of the slide to a greater or lesser degree. To hold the gate in its adjusted positions, a retaining device is provided, and consists of a spring-wire 30, having a helical bend at one end and beyond which the wire is directed downwardly and engaged in a rib at one side of the slide, the wire proper being passed transversely of the slide and gate and having its opposite end bent upwardly into hook form to present a handle. The helical bend of the spring-wire holds the wire yieldably in position to engage the slots of the gate interchangeably as the gate is shifted, and by grasping the handle this locking-wire may be raised from accurate position to permit of adjustment of the gate.

To discharge the fertilizer from the hopper 21, it is only necessary to shift the slide until its slot 26, or that portion which is uncovered by the gate 28, is in registration with the opening 23, and as the quantity of fertilizer deposited depends in a large degree upon the size of the opening presented it will be understood that by shifting the gate the proper quantity of fertilizer deposited may be insured.

To shift the slide, it is provided with a stem 30', which is slidably engaged with a perforated lug 31 on the transverse brace 32 between the sides 5 of the beam, and upon this stem is disposed a helical spring 33, which bears with its ends against the lug and the front of the slide, respectively, to hold the latter yieldably at the rearward limit of its movement and to return it to such position when released from its forward position.

To automatically draw the stem forwardly and then release it, a lever 34 is pivoted between the sides of the beam and is connected at one end to the stem 30' and at its opposite end to a pitman 35, having a hook 36 upon the upper face of its rear end portion, which lies in the path of movement of a cam 37 upon one end of the hub of the ground-wheel, this hook portion being narrowed transversely to engage in the circumscribing groove 38 in the hub and by engagement with which the hook portion holds the pitman against such lateral displacement as would move the hook from the path of the cam. The end of the pitman that has the hook is provided with a laterally-directed flange 39 in the path of movement of a pin 40, carried by the hub of the wheel, and which pin, after engagement of the cam with the hook and movement of the pitman thereby as the wheel rotates, passes into contact with the lateral flange and raises it with the hook from engagement with the cam. By positioning the pin closer to the cam its action will occur after the pitman has been moved a shorter distance, so that the slide in the hopper will be withdrawn a shorter distance and the exposed opening of the hopper will be less, while shifting the pin in the opposite direction will have the converse result. When the cam releases the hook, the helical spring returns the slide, and therewith the pitman, to its normal position.

The hopper 20 is divided into a major compartment 41 to receive corn and a minor compartment 42 to receive beans or other seed to be planted in connection with the corn, and the upper face of the bottom of the hopper is recessed, as shown at 43, and in the bottom of this recess are perforations 44, extending in a line longitudinally of the hopper, and an additional perforation 45 spaced laterally therefrom. The perforation 44 communicates with the major compartment, while the perforations 45 communicate with the minor compartment. That portion of the recess 43 in which is the perforation 45 is broadened laterally and extends only part way of the length of the hopper, and the rear wall of this broadened portion is beveled as shown at 46. In the recess, which is continued through the front and rear walls of the hopper, is a slide 47, which at its forward end is broadened to correspond to the broadened portion of the recess, and in the slide are perforations 48 for registration with the perforations 44 and a perforation 49 for registration with the perforation 45 when the slide is drawn rearwardly, and when the slide is at the forward limit of its movement the perforations are out of registration. Thus by reciprocating the slide the contents of the compartments of the hopper may be intermittently dropped. The rear end of the laterally-broadened portion of the slide is beveled upwardly, so that any corn that may drop into the recess behind this part of the slide will be scooped and raised upon the bevel of the recess, thus preventing stopping of the slide by lodgment of corn between it and the rear end of the recess.

To regulate the passage of seeds through the perforations of the slide, said slide has annular recesses in its upper face, and the perforations of the slide are formed in the bottoms of these recesses and eccentric thereto, and in each recess is rotatably mounted a disk 50 concentric therewith and having therein a perforation 51, the upper end of which is flared to permit of ready access of the seeds thereto, the upper and lower edges of these flares being illustrated by the concentric circles in Fig. 4 of the drawings. To each of the disks is attached a latch in the form of a spring-wire 52, which projects beyond the periphery of the disk and has an upturned end 53, forming a handle which may be grasped to raise the latch from the segmental rack 54, which is mounted upon the slide concentrically with the disk and which when engaged by the spring-wire holds the disk against oscillation, with its perforation registering to a greater or lesser degree with the corresponding perforation of the slide.

To reciprocate the seed-slide, it is provided with a stem 55, which extends from the rear side of the seed-hopper and slidably engages the perforation of a lug 56 upon the brace 57 between the sides 5 of the beam, and upon this stem is disposed a helical spring 58, which bears with its ends against the slide and lug, respectively, and holds the slide yieldably and normally in position to close the discharge-openings in the bottom of the hopper. To draw the slide rearwardly and open the discharge-openings, a lever 59 is mounted between the sides of the beam and is connected at its upper end with the stem 55, said lever projecting downwardly below the brace and having pivoted to its lower end a pitman 60, having a narrowed hook portion 61, disposed in the circumscribing-groove of the ground-wheel hub and in the path of the cam of the hub for engagement by said cam alternately with the hook of the pitman 35. Said pitman has also a laterally-directed flange 62 in the path of movement of the pin 40, so that the pitman 60 will be raised from engagement with the cam in the same manner and alternately with the pitman 35. With this construction it will be seen that as the implement is advanced the furrow will be opened and that fertilizer will be intermittently and automatically dropped into the furrow, the fertilizer-hopper having a discharge-spout 22, which directs the fertilizer centrally and behind the furrow-opener, and that the discharge-openings of the seed-hopper will be intermittently and automatically opened to discharge seeds into the furrow, the major compartment of the seed-hopper having discharge-spouts 64 and 65, which diverge downwardly and longitudinally of the implement, so that two lots of seeds are dropped at the proper distance apart, depending upon the spacing of the lower ends of the discharge-spouts. At the same time the beams are discharged in proper number through the discharge-spout 66, which leads from the minor compartment.

To cover the seeds and hill up the rows, covering-shovels 67 are provided and have vertical stems 68, disposed in vertical channels in the sides 5 of the beam and in which the stems are held by bolts 68', engaged through the stems and sides of the beam, each of the stems having a longitudinal series of perforations 69 for interchangeable reception of the securing-bolts to permit of vertical adjustment of the covering-shovels, so that they may enter the ground to a greater or lesser degree to turn up the earth into a higher or lower hill. The bolts 68' serve also for attachment of the lower ends of braces 70, which at their upper ends are attached to the handles 71, having perforations 72 at their forward ends, in which are received the ends of the axle of the ground-wheel, the handles being held in engagement with the said axle by means of the keys 73, which are engaged through the axle.

When the implement reaches hard ground in which the seeds cannot take root, it is desirable that the dropping of fertilizer and seeds be stopped, and in order to accomplish this result shoes or runners 74 are provided and are connected through the medium of their arms or hangers 75 to the brackets 7. These shoes or runners are of arc shape, so that when ground is reached that is too hard for them to sink into they will run upon the surface of the ground, and in so doing will raise the ground-wheel out of active position, it being noted that the runners project below the wheel.

To the front of the seed-hopper is attached a tool-box 76.

To hold the pitmen of the dropping mechanisms yieldably against movement by the pin and lug and to return them when released thereby, a helical spring 77 is provided and is connected at its ends to the pitmen, so that it extends substantially vertically in advance of and near to the hub of the ground-wheel. As each pitman is moved by the pin the spring is placed under additional tension, and when released by the pin the pitmen are drawn inwardly with their hooks into the slot of the hub.

What is claimed is—

1. A planter comprising a beam having a supporting ground-wheel, a hopper mounted upon the beam and having dropping mechanism, a furrow-opener pivoted to the beam in advance of the hopper for movement to raise and lower its point, a brace pivoted to the furrow-opener, racks upon the beam, a bolt adapted for engagement with the teeth of the racks interchangeably and with which the brace is pivotally connected, and means for holding the bolt engaged with the racks.

2. A planter comprising a beam having a supporting ground-wheel, a hopper mounted upon the beam and having dropping mechanism, a furrow-opener pivoted to the beam in advance of the hopper for movement to raise and lower its point, racks upon the beam, said beam being slotted vertically between the racks, a slotted bolt disposed in the slot of the beam with its head removably engaged with the racks, a brace pivotally connected with the furrow-opener and in the slot of the bolt, and a nut engaged with the bolt and adapted to impinge against the beam to hold the head of the bolt in engagement with the racks.

3. A planter comprising a beam having a supporting ground-wheel, hoppers upon the beam at opposite sides of the wheel and having discharge-spouts, valve mechanisms for the discharge-spouts, a lever connected with each of the valve mechanisms, a pitman connected with each lever, each of said pitmen having a hook and a laterally-directed flange at its free end, said ground-wheel having its hub provided with a circumscribing groove in which the hooks normally lie, a lug upon the hub for engagement with the hooks successively to move the pitmen in one direction, and a projection upon the hub disposed for engagement with the flanges successively to raise the hooks from the lug.

4. A planter comprising a beam having a supporting ground-wheel, hoppers upon the beam at opposite sides of the wheel and having discharge-spouts, valve mechanisms for the discharge-spouts, a lever connected with each of the valve mechanisms, a pitman connected with each lever and having a hook and a laterally-directed flange at its free end, said ground-wheel having its hub provided with a circumscribing groove in which the hooks normally lie, a lug upon the hub for engagement with the hooks successively to move the pitmen in one direction, a projection upon the hub disposed for engagement with the flanges successively to raise the hooks from the lug, means for returning the pitmen and valve mechanisms to their original positions, and a helical spring connected to both pitmen for holding the hooks yieldably in engagement with the groove of the wheel-hub.

5. In a planter, the combination with a ground-wheel, hoppers having valve mechanisms, and operative connections between the valve mechanisms and the ground-wheel, of runners extending below the ground-wheel and connected with the ground-wheel, for the purpose set forth.

6. In a planter the combination with a beam having hoppers thereon and a supporting ground-wheel, of a dropping mechanism for each hopper operatively connected with the ground-wheel, and runners connected to the beam at opposite sides of the ground-wheel and projecting therebelow, for the purpose set forth.

7. The combination with a hopper having a recess in its bottom and a perforation through the bottom of the recess, the rear end wall of the recess being beveled, of a valve mechanism comprising a slide mounted in the recess and movable therein to cover and uncover the perforation, the rear end of the slide being beveled upwardly, for the purpose set forth.

8. In a planter, the combination with a hopper having a discharge-opening, of a slide having an opening therethrough to register at times with the discharge-opening, said slide having ribs at opposite sides of its opening, a gate slidably mounted between the ribs to cover and uncover the opening of the slide, said gate having transverse grooves, and a latch consisting of a spring-wire secured to the slide and disposed transversely of the gate for removable engagement with the grooves thereof interchangeably.

In testimony whereof I affix my signature in presence of two witnesses.

JEFFERSON L. COX.

Witnesses:
  J. E. BURWELL,
  CHAS. F. TURMAN.